US008729919B2

United States Patent
Nishikawa et al.

(10) Patent No.: US 8,729,919 B2
(45) Date of Patent: May 20, 2014

(54) LIGHT SOURCE EVALUATION DEVICE AND SOLAR CELL EVALUATION DEVICE

(75) Inventors: Yoshihiro Nishikawa, Kobe (JP); Tsutomu Okura, Hachioji (JP)

(73) Assignee: Konica Minolta Optics, Inc., Sakai-shi (JP)

( * ) Notice: Subject to any disclaimer, the term of this patent is extended or adjusted under 35 U.S.C. 154(b) by 0 days.

(21) Appl. No.: 13/816,448

(22) PCT Filed: Jul. 15, 2011

(86) PCT No.: PCT/JP2011/004061
§ 371 (c)(1),
(2), (4) Date: Feb. 11, 2013

(87) PCT Pub. No.: WO2012/020542
PCT Pub. Date: Feb. 16, 2012

(65) Prior Publication Data
US 2013/0169306 A1    Jul. 4, 2013

(30) Foreign Application Priority Data
Aug. 11, 2010   (JP) .................................. 2010-180396

(51) Int. Cl.
*G01R 31/26*    (2014.01)

(52) U.S. Cl.
USPC .................. 324/761.01; 250/205; 250/206

(58) Field of Classification Search
USPC ............... 324/761.01, 762.01; 250/205, 206; 356/72, 73
See application file for complete search history.

(56) References Cited

U.S. PATENT DOCUMENTS

| 6,946,858 B2 | 9/2005 | Matsuyama |
| 2006/0085167 A1* | 4/2006 | Warfield et al. ............... 702/188 |

(Continued)

FOREIGN PATENT DOCUMENTS

| JP | 8-235903 | 9/1996 |
| JP | 2004-134748 | 4/2004 |

(Continued)

OTHER PUBLICATIONS

J. Metzdorf, "Calibration of solar cells: The differential spectral responsivity method", Applied Optics, May 1, 1987, vol. 26, No. 9, pp. 1701.

(Continued)

*Primary Examiner* — Huy Q Phan
*Assistant Examiner* — Adam Clarke
(74) *Attorney, Agent, or Firm* — Cozen O'Connor

(57) ABSTRACT

With a light source evaluation device 10 according to the present invention and a solar cell evaluation device 1 employing the same, a dependency P (λ, Ib) for each wavelength λ of a short-circuit current Ib generated by white bias light of a measurement target solar cell 2, which is pre-measured at each of a plurality (i) of irradiance levels, is regarded as a spectral responsivity Pi (λ) at each irradiance level, and a value for adjusting a light quantity of an illumination light source 3 that illuminates the solar cell 2 is computed using a spectral responsivity Ps (λ), which is computed using the spectral responsivity Pi (λ), a pre-supplied spectral irradiance S (λ) of reference sunlight, and a pre-measured spectral irradiance L (λ) of the illumination light source 3. Therefore the light source evaluation device 10 having this configuration and the solar cell evaluation device 1 employing the same can accurately adjust the light quantity of the illumination light source 3 when evaluating the solar cell 2 of which spectral responsivity changes depending on the light quantity.

6 Claims, 8 Drawing Sheets

(56) References Cited

U.S. PATENT DOCUMENTS

| | | | |
|---|---|---|---|
| 2010/0219327 A1* | 9/2010 | Arbore et al. | 250/206 |
| 2011/0012636 A1* | 1/2011 | Carstensen et al. | 324/761.01 |
| 2011/0231120 A1* | 9/2011 | Nishikawa | 702/60 |
| 2012/0004868 A1* | 1/2012 | Fafard | 702/58 |
| 2012/0306525 A1* | 12/2012 | Mone | 324/761.01 |
| 2012/0313661 A1* | 12/2012 | Jungwirth et al. | 324/761.01 |

FOREIGN PATENT DOCUMENTS

| | | |
|---|---|---|
| JP | 2004281706 A * | 10/2004 |
| WO | WO 2010/058649 | 5/2010 |
| WO | WO 2010058649 A1 * | 5/2010 |

OTHER PUBLICATIONS

IEC 60904. i.e., "Part 2: Requirements for reference solar devices", Photovoltaic devices, Int'l. Standard, CEI/IEC 60904-2, 2007.

ISO 15387-2005, i.e., "Space systems—Single—junction solar-cells—Measurement and calibration procedures", ISO 2005.

J. Metzdorf et al., "Absolute Indoor Calibration of Large-Area Solar Cells", 5$^{th}$ European Symposium, Photovoltaic Generators in Space, Scheveningen, The Netherlands, Sep. 30-Oct. 2, 1986, (ESA SP-267, Nov. 1986).

J. Metzdorf et al., "Principle and Application of Differential Spectroradiometry", Metrologia 1991, 28, 247-250.

JIS C8912: 1998, "Solar simulators for crystalline solar cells and modules".

* cited by examiner

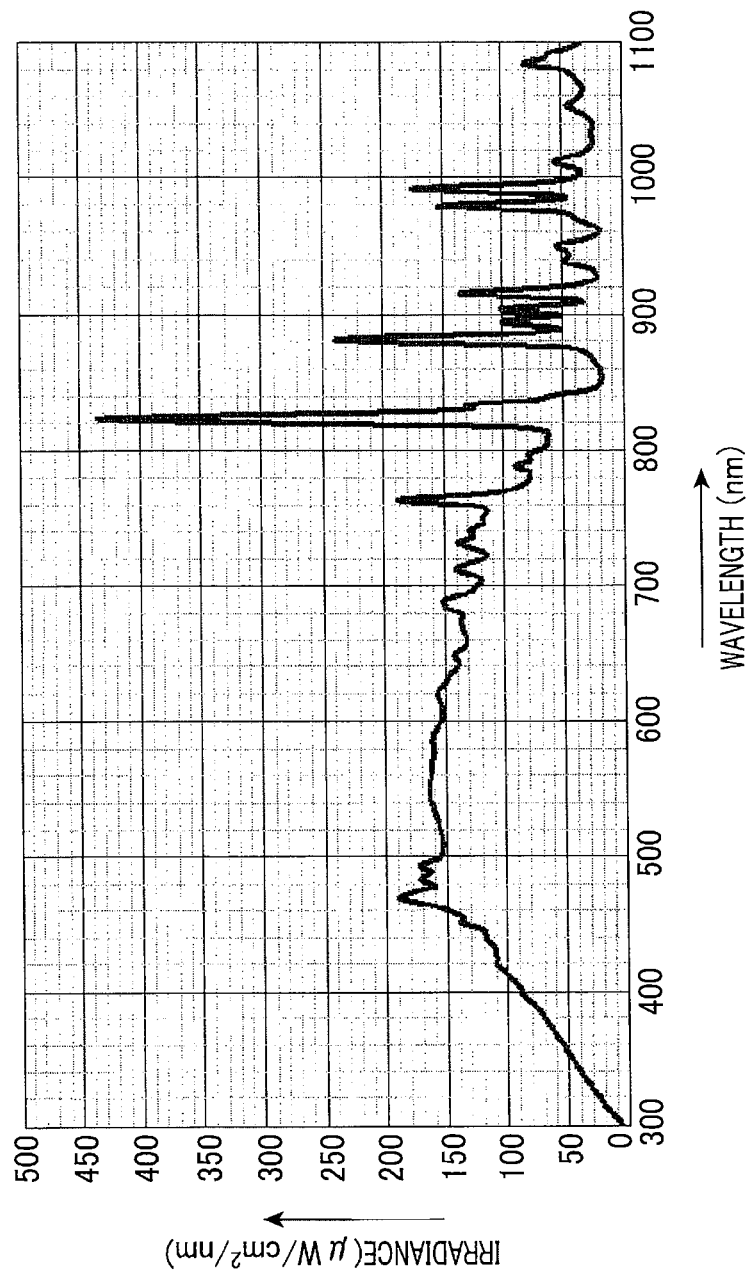

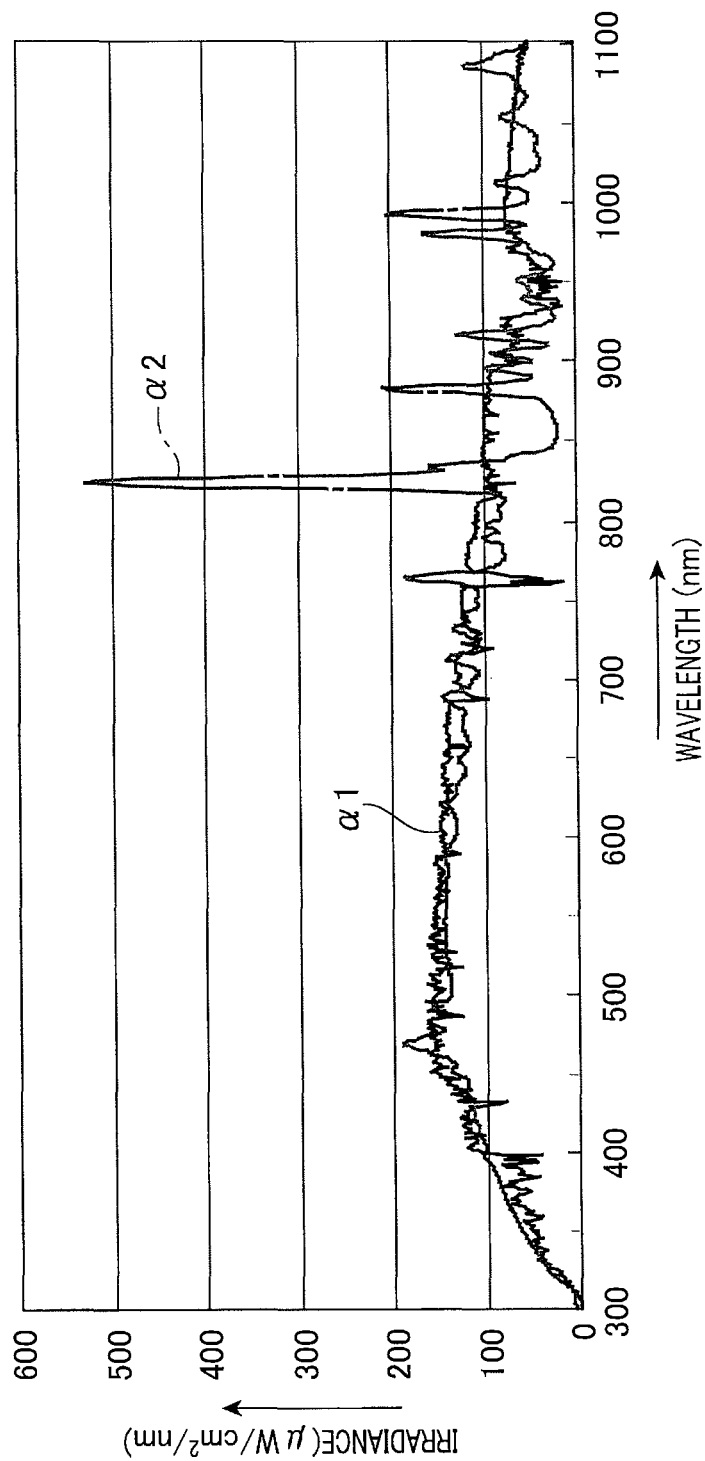

LIGHT SOURCE EVALUATION DEVICE AND SOLAR CELL EVALUATION DEVICE

RELATED APPLICATIONS

This is a U.S. National Phase Application under 35 USC 371 of International Application PCT/JP2011/004061 filed on Jul. 15, 2011.

This application claims the priority of Japanese application no. 2010-180396 filed Aug. 11, 2010, the entire content of which is hereby incorporated by reference.

TECHNICAL FIELD

The present invention relates to a light source evaluation device for evaluating a light source and a solar cell evaluation device for evaluating a solar cell employing the same.

BACKGROUND ART

Solar cells are now widely used, and the competition among manufacturers on the performance of solar cells is heating up. Many types of solar cell composition have also been developed, including single crystal silicon, amorphous silicon, thin film silicon and organic compounds. In order to fairly evaluate the photoelectric conversion efficiency of these solar cells, methods for evaluating solar cells are defined by IEC 60904 and JIS (C8905 to C8911). IEC is an acronym for International Electro technical Commission, and JIS is an acronym for Japanese Industrial Standards.

Since a solar cell has a unique spectral response characteristics due to material and structure, the photoelectric conversion characteristic of a solar cell greatly depends on the spectral irradiance of the irradiation light used for performance evaluation. Therefore as mentioned above, the evaluation method is defined by standards. Generally the performance of a solar cell is measured indoors using a solar simulator that has spectral irradiance L ($\lambda$) approximated to the spectral irradiance of the reference sunlight (=S ($\lambda$)) under standard test conditions agreed on internationally.

However the solar simulator is constructed by combining a xenon lamp and an optical filter, for example, and it is extremely difficult to approximate the illumination light thereof to reference sunlight. FIG. 6 is a graph depicting an example of the spectral irradiance S ($\lambda$) of the reference sunlight, according to the above-mentioned IEC 60904. FIG. 7 is a graph depicting an example of the spectral irradiance L ($\lambda$) of a solar simulator. The graph in FIG. 8 shows a result of integrating the spectral irradiance S ($\lambda$) in FIG. 6 and the spectral irradiance L ($\lambda$) in FIG. 7, which have different wavelength regions and illumination levels. In FIG. 8, the graph indicated by a reference symbol $\alpha 1$ is the spectral irradiance S ($\lambda$) of the reference sunlight, and the graph indicated by a reference symbol $\alpha 2$ is the spectral irradiance L ($\lambda$) of the solar simulator.

Therefore in order to reproduce the reference sunlight, Patent Document 1 discloses a solar simulator which generates light having a similar spectrum of the sunlight, from ultraviolet to infrared, by selectively transmitting/reflecting light, using a mirror having wavelength dependency, out of lights from a plurality of light sources (xenon lamp and halogen lamp) which emit lights in a mutually different wavelength range, and combining the transmitted/reflected lights.

Patent Document 2 discloses a technique to correct changes of the light quantity of a solar simulator, which measures the irradiance of the light source, and matches the response characteristic of the irradiance measurement sensor with the response characteristic of the solar cell itself, so as to cancel the changes of the light quantity of the solar simulator. Non-Patent Document 1 below will be referred to in the later mentioned embodiments.

The above-mentioned techniques are all calibration methods for a single solar simulator. However solar simulators differ depending on the manufacturer, and have machine differences even if the manufacturer is the same, therefore if a solar cell is measured using a different solar simulator, the electric power generation changes even if the solar simulator satisfies the above-mentioned characteristics.

Therefore the measurer sends a solar cell sample and requests the National Institute of Advanced Industrial Science and Technology (a national institute that provides an internationally unified reference sunlight spectrum, or an equivalent institute), for example, to perform measurement. In response to this request, the institute determines the short-circuit current Isc of the sample at natural sunlight AM 1.5 and 100 mW/cm$^2$ using its own solar simulator that can infinitely approximate light to the reference sunlight, and returns the sample with the measured value (=A) to the measurer. Then the measurer uses the returned sample as the reference cell at their company, and adjusts the light quantity of the solar simulator. In other words, the measurer adjusts the light quantity of the solar simulator first using the reference cell so that the short-circuit current Isc becomes A, then measures the characteristic of the actual measurement target solar cell (inspection target product). As mentioned above, it is difficult to accurately reproduce the optical spectrum of the reference sunlight, but with this technique, the solar simulators of each company can match the reference sunlight as accurately as possible.

In order to complete calibration using the reference cell according to this technique however, it is necessary for the measurer to create a sample and send it to a public institute, where the institute measures the sample and sends it back. This takes time and is costly. Furthermore, calibration of the solar simulator is not completed all at once, but must be repeated with creating a new reference cell every time the spectral responsivity of the solar cell to be measured changes, hence this takes enormous time and cost.

The inventor of the present invention therefore proposed a method for evaluating a solar cell which does not require the reference cell, by measuring the spectral responsivity P ($\lambda$) of the measurement target solar cell in advance, and converting the short-circuit current, due to the reference sunlight with the spectral irradiance S ($\lambda$) by $$ES=EL \cdot \{\int S(\lambda) \cdot P(\lambda) d\lambda\} / \{\int L(\lambda) \cdot P(\lambda) d\lambda\}$$

where EL is the short-circuit current due to the irradiation light by the solar simulator with the spectral irradiance L($\lambda$) (PCT/JP 2009/066105 (W0/2010/058649A1); published on May 27, 2010).

The above technique, however, is effective for crystalline solar cells of which spectral responsivity P ($\lambda$) is stable, as in the case of single crystalline silicon solar cells, but an error is generated if applied to solar cells having characteristics where the spectral responsivity P ($\lambda$) changes depending on the irradiated light quantity, as in the case of thin film solar cells (e.g. amorphous, fine crystal, compound, dye-sensitization, organic).

Patent Document 1: Japanese Patent Application Laid-Open No. H8-235903

Patent Document 2: Japanese Patent Application Laid-Open No. 2004-134748

Non-Patent Document 1: J. Metzdorf, "Calibration of solar cells: the differential spectral responsivity method", Applied Optics, May 1, 1987, Vol. 26, No. 9, pp. 1701

SUMMARY OF THE INVENTION

With the foregoing in view, it is an object of the present invention to provide a light source evaluation device which allows adjusting the light quantity of the illumination light source more accurately, when evaluating a solar cell of which spectral responsivity changes depending on the light quantity, and a solar cell evaluation device employing the same.

With a light source evaluation device according to the present invention and a solar cell evaluation device employing the same, a dependency $P(\lambda, Ib)$ for each wavelength $\lambda$ of a short-circuit current Ib generated by white bias light of a measurement target solar cell, which is pre-measured at each of a plurality (i) of irradiance levels, is regarded as a spectral responsivity $Pi(\lambda)$ at each irradiance level, and a value for adjusting a light quantity of a light source that illuminates the solar cell is computed using a spectral responsivity $Ps(\lambda)$, which is computed using the spectral responsivity $Pi(\lambda)$, a pre-supplied spectral irradiance $S(\lambda)$ of reference sunlight, and a pre-measured spectral irradiance $L(\lambda)$ of the light source. Therefore the light source evaluation device having this configuration and the solar cell evaluation device employing the same can accurately adjust the light quantity of the illumination light source when evaluating the solar cell of which spectral responsivity changes depending on the light quantity.

These and other objects, features and advantages of the present invention will become more apparent upon reading the following detailed description along with the accompanying drawings.

BRIEF DESCRIPTION OF THE DRAWINGS

FIG. 7 is a graph depicting a spectral irradiance of the solar simulator according to an example.

FIG. 8 is a graph depicting a difference of spectral irradiance between the reference sunlight and the solar simulator of the example.

BEST MODE FOR CARRYING OUT THE INVENTION

An embodiment of the present invention will now be described with reference to the drawings. In each drawing, composing elements denoted with a same reference symbol have a same configuration where redundant is omitted. In this Description, a generic name is denoted with a reference symbol without subscript, and an individual configuration is denoted with a reference symbol with subscript.

Figure 1:
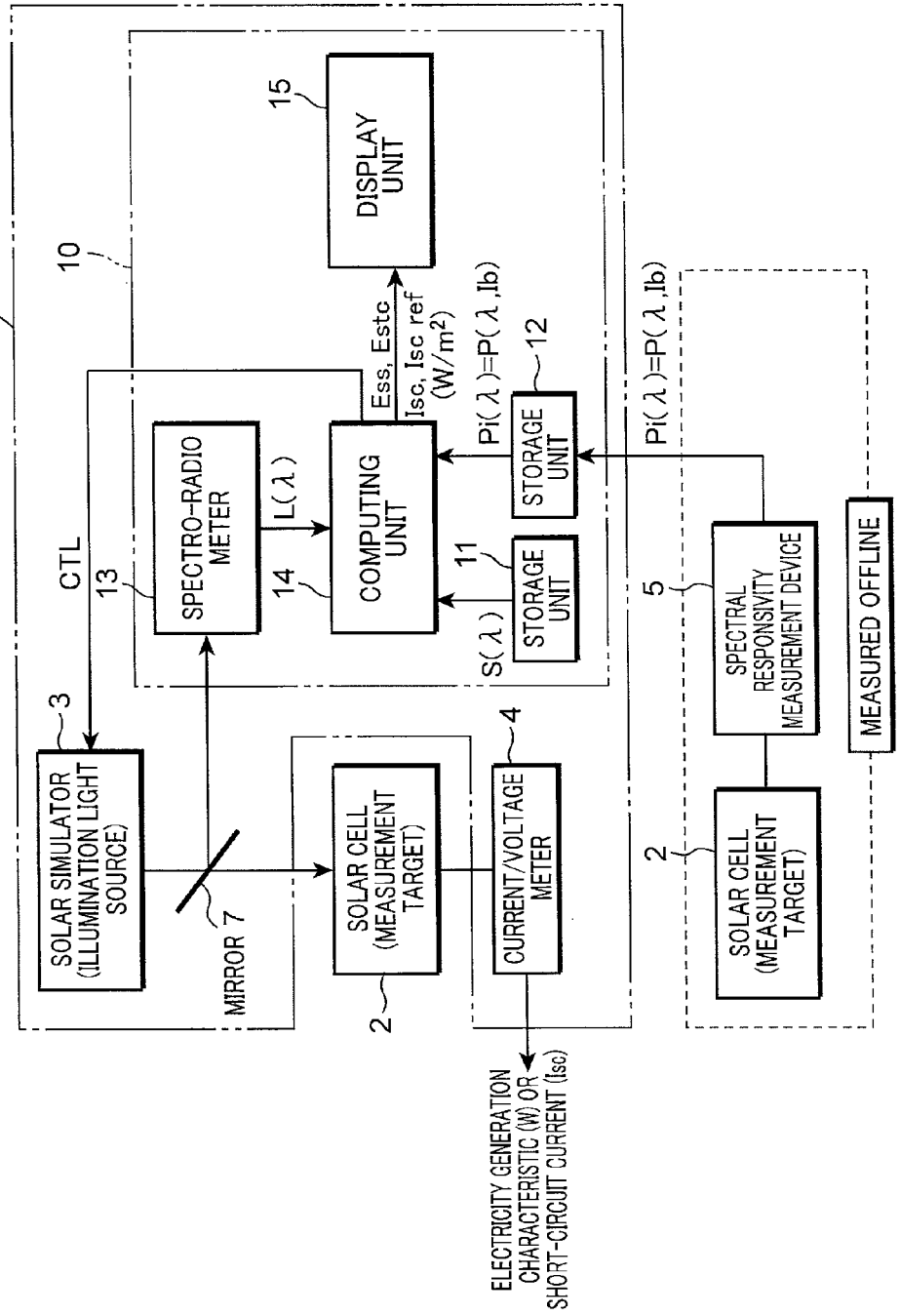
FIG. 1 is a block diagram depicting a configuration of a solar cell evaluation device according to an embodiment of the present invention.

FIG. 1 is a block diagram depicting a configuration of a solar cell evaluation device 1, including a light source evaluation device 10 according to an embodiment of the present invention. This solar cell evaluation device 1 generates light simulating the reference sunlight defined in the above-mentioned JIS (C8912), and includes a solar simulator (illumination light source) 3 which irradiates light onto a measurement target solar cell 2, a current/voltage meter 4 that measures an electricity generation characteristic (e.g. short-circuit current Isc) of the solar cell 2 by the irradiation light, and a light source evaluation device 10. The light source evaluation device 10 includes first and second storage units 11 and 12, which are formed of memory elements for example, a computing unit 14 which is formed of a microprocessor for example, and a display unit 15 which is formed of an LCD for example. This solar cell evaluation device 1 can accurately evaluate even a solar cell of which spectral responsivity changes depending on the light quantity, and for the solar simulator (illumination light source) 3, a conventionally available model can be used.

In the solar cell evaluation device 1, when the solar simulator 3 irradiates the illumination light, the light quantity thereof is adjusted by the light source evaluation device 10. When this adjustment is performed, the light source evaluation device 10 may be placed in the irradiation target area, instead of the measurement target solar cell 2, and the light quantity thereof may be measured, but in this embodiment, a mirror 7 is interposed on the optical path from the solar simulator 3 to the solar cell 2, as shown in FIG. 1, and the solar cell evaluation device 1 is configured so that a part of the illumination light from the solar simulator 3 is reflected by the mirror 7 (e.g. 99% of the light is transmitted, and 1% thereof is reflected), and the reflected part of the illumination light enters the light source evaluation device 10.

The data on the spectral irradiance $S(\lambda)$ of the reference sunlight is pre-specified by IEC or the like, as mentioned above, and supplied via recording media or a communication network, and is stored in the first storage unit 11.

The spectral responsivity $Pi(\lambda)$ of the measurement target solar cell 2 is spectral responsivity $P(\lambda)$ which is measured by a spectral responsivity measurement device 5 via offline processing, with changing the irradiance in a plurality (i) of levels. The measured spectral responsivity $P(\lambda)$ is stored in the second storage unit 12, via a recording media or communication network, as the spectral responsivity $Pi(\lambda)$ of the measurement target solar cell 2. JIS (C8915) defines two methods to measure the spectral responsivity $Pi(\lambda)$ of a solar cell 2. The first measurement method is irradiating monochromatic light (irradiating monochromatic light of which half power width is 5 nm or less, and pitch is 25 nm), and sequentially determining current from the solar cell 2 generated thereby. The second measurement method is irradiating the monochromatic light while irradiating white bias light at irradiance 1000 W/m², and sequentially determining the current from the solar cell 2. The reference sunlight is irradiated under standard measurement conditions, therefore the spectral responsivity in a state where white bias light is applied is required. In the case of a solar cell of which spectral responsivity does not depend on the irradiance, such as a single crystal, the first measurement method may be used, but in the case of a solar cell of which spectral responsivity depends on the irradiance, the spectral responsivity measured by the second measurement method is required. Therefore the second measurement method is used in this embodiment.

Figure 6:
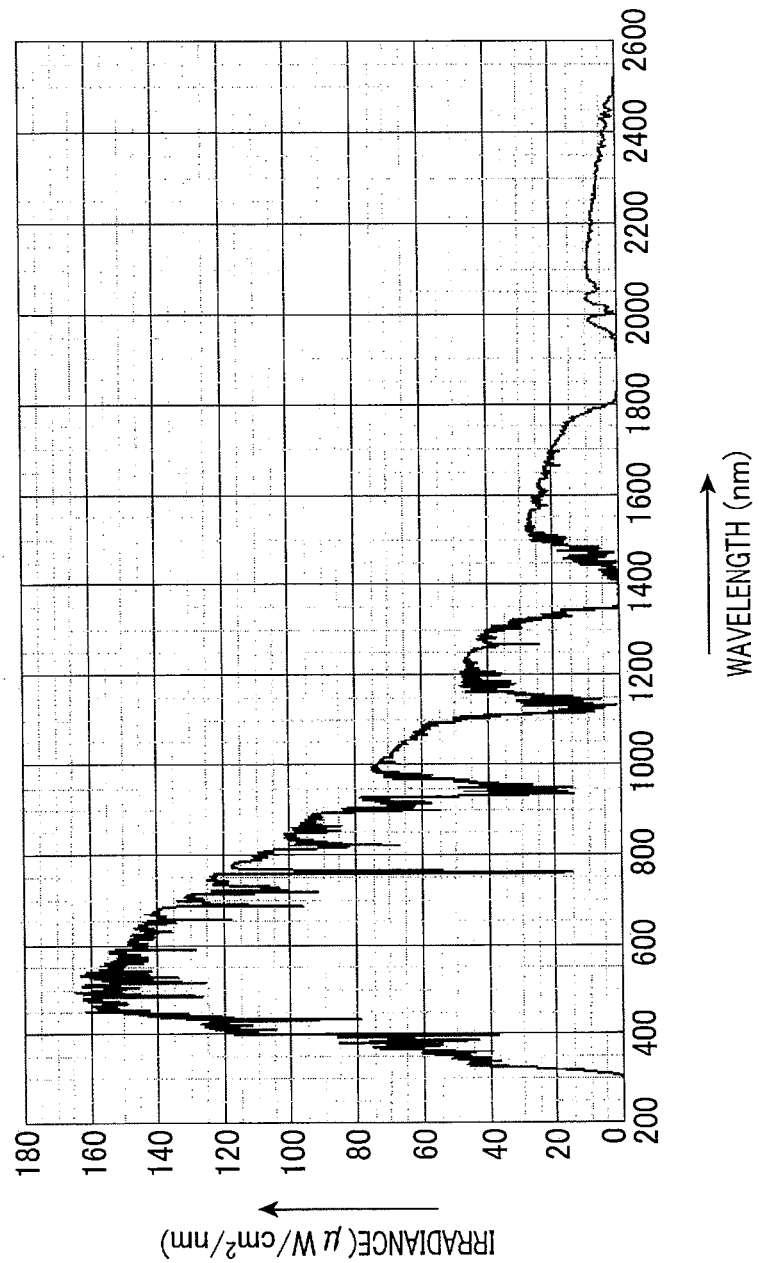
FIG. 6 is a graph depicting a spectral irradiance of the reference sunlight.

In the light source evaluation device 10, the computing unit 14 determines the theoretical short-circuit current Iscref, as mentioned later, based on the data in the first storage device 11, which stores data on the spectral irradiance S ($\lambda$) by the reference sunlight shown in FIG. 6, and data in the second storage device 12, which stores data on the spectral responsivity Pi ($\lambda$) of the solar cell 2 pre-measured at a plurality (i) of irradiance levels, and displays the result on the display unit 15.

$$Iscref = \int Pi(\lambda) * S(\lambda) d\lambda \quad (1)$$

Here Pi ($\lambda$) is the spectral responsivity of the solar cell which is measured with the same irradiance as the reference sunlight. This is denoted with 1 Sun hereinbelow.

Further, in the light source evaluation device 10, if illumination light from the solar simulator 3 to the solar cell 2 enters, the computing unit 14 determines the short-circuit current Isc using the following Expression 2, based on data on the spectral irradiance L ($\lambda$) measured by a spectro-radiometer 13, and data on the spectral responsivity Pi ($\lambda$), and displays the result on the display unit 15.

$$Isc = \int Pi(\lambda) * L(\lambda) d\lambda \quad (2)$$

The result of computing the short-circuit current Isc by the computing unit 14 is displayed on the display unit 15, as mentioned above, and the computing unit 14 also creates a light quantity control signal CTL corresponding to the computing result, and adjusts the light quantity of the solar simulator 3 so that Isc=Iscref is established. The solar cell evaluation device 1 may be configured in such a way that the computing unit 14 outputs the computing result to such an external apparatus as a personal computer via an external interface, and adjusts the light quantity of the solar simulator 3 via the external apparatuses.

Now the method for determining the plurality (i) of spectral responsivity values Pi ($\lambda$) will be described in more detail. This embodiment provides a method for adjusting the light quantity of the solar simulator in measuring a solar cell having non-linear characteristics, using the differential spectral responsivity method (hereafter called DSR) advocated by J. Metzdorf in the above-mentioned Non-Patent Document 1.

First the above-mentioned DSR method (method for guaranteeing the spectral responsivity under 1000 W/m² irradiance) will be outlined, while details are disclosed in the above-mentioned Non-Patent Document 1. In this embodiment, an integrated value of the spectral irradiance measured by the spectro-radiometer 13 is used as the irradiation intensity quantity used for the DSR method.

Figure 2:
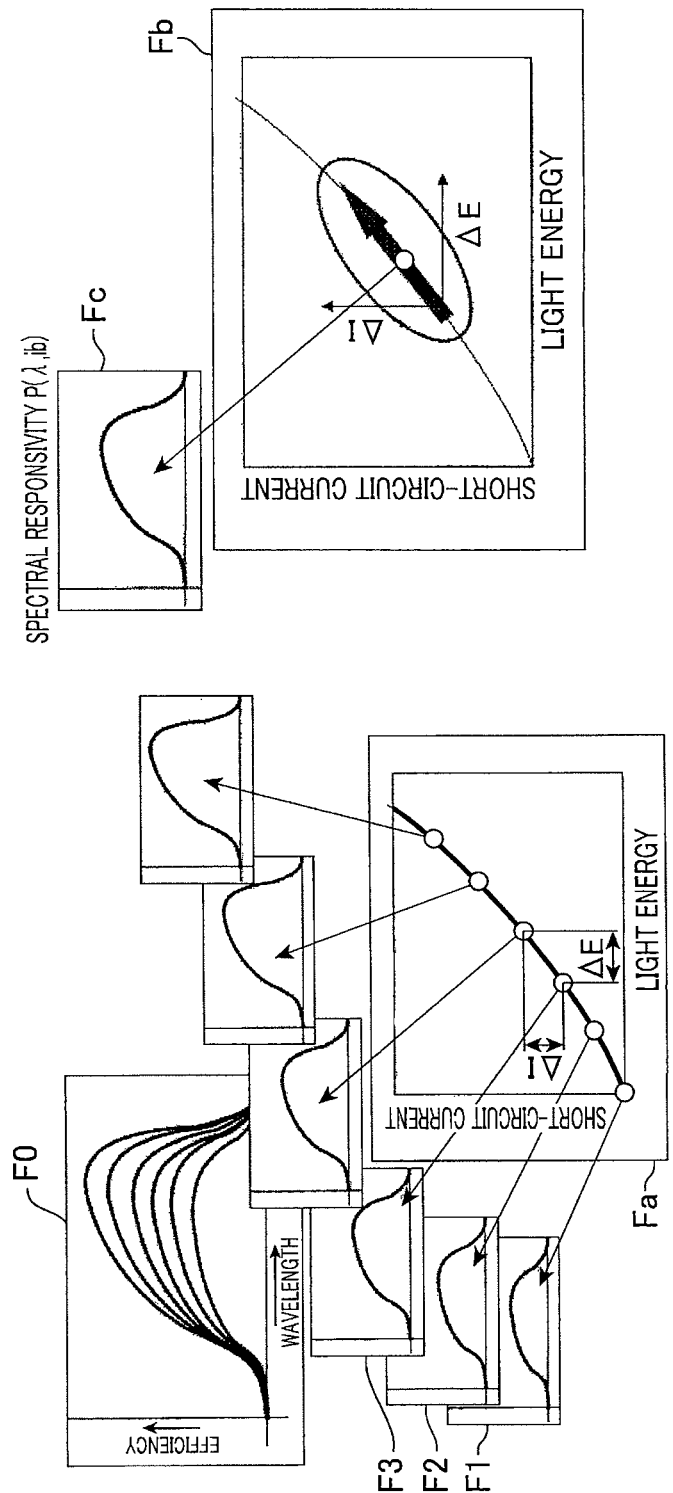
FIG. 2 is a diagram depicting a concept of the spectral responsivity of the solar cell evaluation device according to an embodiment of the present invention.
Figure 3:
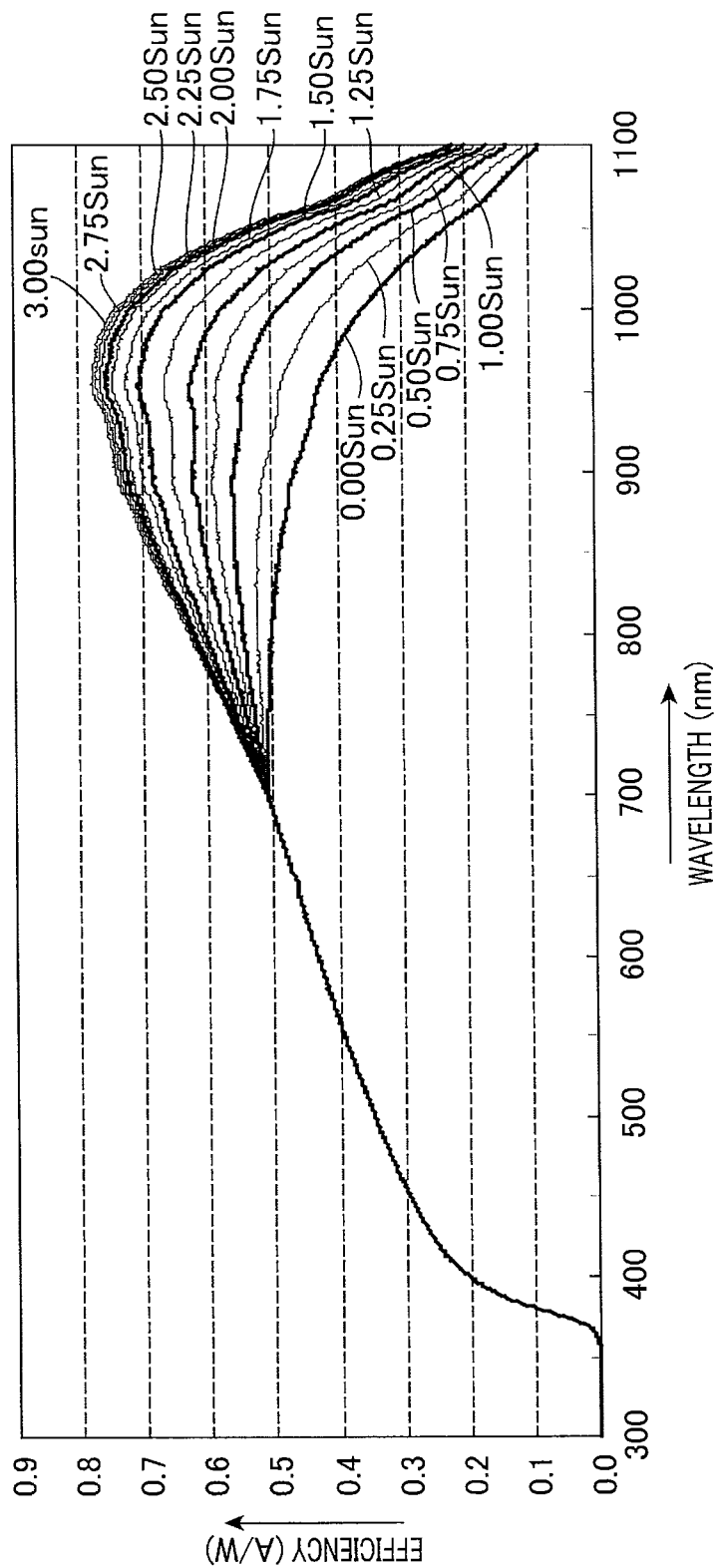
FIG. 3 is a graph depicting a dependency of the spectral responsivity on the irradiance in a polycrystal silicon solar cell.

FIG. 2 is a diagram depicting a concept of the spectral responsivity Pi ($\lambda$) of the light source evaluation device 10. As FIG. 2 shows, as the irradiation intensity of the light irradiating on the solar cell increases and the short-circuit current increases, the spectral responsivity of long wavelength increases. This state is shown by reference symbols F0: F1, F2, F3, . . . (F0 is a collective diagram of F1, F2, F3, . . . , that is, an illustration of FIG. 3). If each diagram of F1, F2, F3, . . . is plotted on a graph of which abscissa is irradiation intensity (light energy) and ordinate is short-circuit current, as shown in the diagram of the reference symbol Fa, it is shown that the short-circuit current changes by $\Delta I$ if the irradiation intensity changes by $\Delta E$.

In the case of a solar cell having linear characteristics, the inclination does not depend on the irradiation intensity and has a constant value, hence the graph representing the relationship between the irradiation intensity and the short-circuit current is a straight line. In the case of a solar cell having non-linear characteristics, on the other hand, the inclination differs depending on the irradiation intensity, hence the graph representing the relationship between the irradiation intensity and the short-circuit current is a curved line, as the diagram with reference symbol Fa shows. In this example, as the irradiation light energy increases, the sensitivity on the longer wavelength side increases and the value of $\Delta I/\Delta E$ increases, and the graph representing the relationship between the irradiation intensity and the short-circuit current deviates from the straight line.

Therefore in order to determine the relationship between the spectral irradiance L ($\lambda$) and the short-circuit current Isc, the spectral responsivity Pi ($\lambda$, ib) at each short-circuit current (ib) of various solar cells is determined, and the relationship between P ($\lambda$, ib) and the irradiation intensity A ($\lambda$) when measuring the spectral responsivity is determined as follows as the differential response. First the change $\Delta E(\lambda)$ of the irradiated light energy is determined by the following Expression 3, where k is a small numerical value.

$$\Delta E(\lambda) = k \times A(\lambda) \quad (3)$$

A change $\Delta I$ ($\lambda$) of the short-circuit current I is determined by the following Expression 4.

$$\Delta I(\lambda) = P(\lambda, ib) \times \Delta E(\lambda) \quad (4)$$

Therefore the change $\Delta E$ (I) of the entire energy is determined by the following Expression 5.

$$\Delta E(I) = \int \Delta E(\lambda) d\lambda = \int k \times A(\lambda) d\lambda \quad (5)$$

Therefore the change $\Delta I$ of the total short-circuit current is determined by the following Expression 6.

$$\Delta I = \int \Delta I(\lambda) = \int P(\lambda, ib) \times \Delta E(\lambda) d\lambda = \int P(\lambda, ib) \times k \times A(\lambda) d\lambda \quad (6)$$

The relationship P (ib) of the subtle change (dI) of the short-circuit current caused by the subtle change (dE) of the irradiation intensity of light having a specific spectrum is given by the following Expression 7.

$$\frac{dI}{dE} = P(ib) \quad (7)$$
$$= \frac{\int P(\lambda, ib) \cdot k \cdot A(\lambda) \cdot d(\lambda)}{\int k \cdot A(\lambda) \cdot d(\lambda)}$$
$$= \frac{\int P(\lambda, ib) \cdot A(\lambda) \cdot d(\lambda)}{\int A(\lambda) \cdot d(\lambda)}$$

Figure 4A:
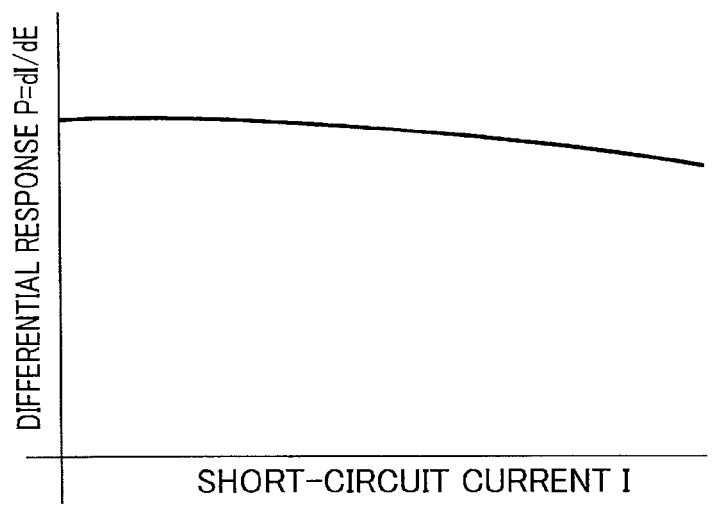
FIG. 4 shows graphs depicting a relationship of the short-circuit current of a solar cell, an irradiation light energy E and a differential response thereof.

The differential response between the value of the short-circuit current Ib and the value of the irradiation light energy E is determined by Expression 7, as shown in FIG. 4A, for example. The relationship shown in FIG. 4A changes depending on the waveform A ($\lambda$) of the spectral irradiance of the irradiated light.

A reciprocal of the differential response obtained by Expression 7 is integrated in a range from 0 to a specific short-circuit current value I, as shown in Expression 8, whereby the irradiation light energy E (I) can be determined.

$$E(I) = \int_0^I \frac{dE}{dib} \, dib = \int_0^I \frac{1}{P(ib)} \cdot dib \quad (8)$$

The irradiated light energy E shown in Expression 8 is a function of I, which becomes the upper limit of the integration range. At the same time, the relationship between the irradiation intensity E generated by the specific spectral irradiance waveform and the solar cell short-circuit current I generated thereby depends on the spectral irradiance A (λ) as shown in FIG. 4B.

Figure 4B:
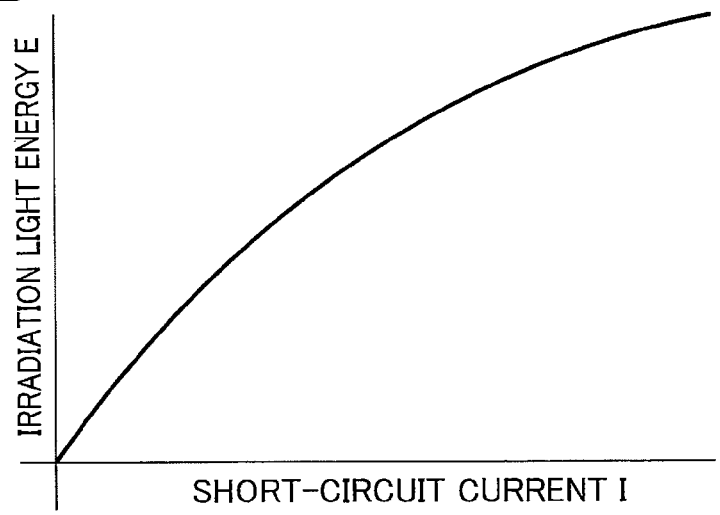

In the calculation of Expression 7, the relationship of FIG. 4B is determined using Expression 8, where the spectral irradiance A (λ) is a spectrum of AM 1.5, and the short-circuit current Istc in the case where the irradiation light energy Estc is the above-mentioned 1000 W/m² is calculated using Expression 9. Then the obtained value is the short-circuit current of the solar cell 2 when being illuminated by the reference solar light.

$$E_{STC} = \int_0^{I_{STC}} \frac{1}{P(ib)} \cdot d\lambda = 1000 \text{ W/m}^2 \qquad (9)$$

The irradiation intensity Ess when illuminated with the actual solar simulator 3 is given by Expression 10.

$$E_{SS} = \int_0^{I_{STC}} \frac{1}{P(ib)} \cdot d\lambda = 1000 \text{ W/m}^2 \qquad (10)$$

The computing unit 14 repeats measurement of the spectral irradiance L (λ) so as to implement the irradiation light energy Ess of the solar simulator 3 determined like this, whereby the solar simulator 3 can be adjusted to the appropriate irradiation intensity.

Figure 5:
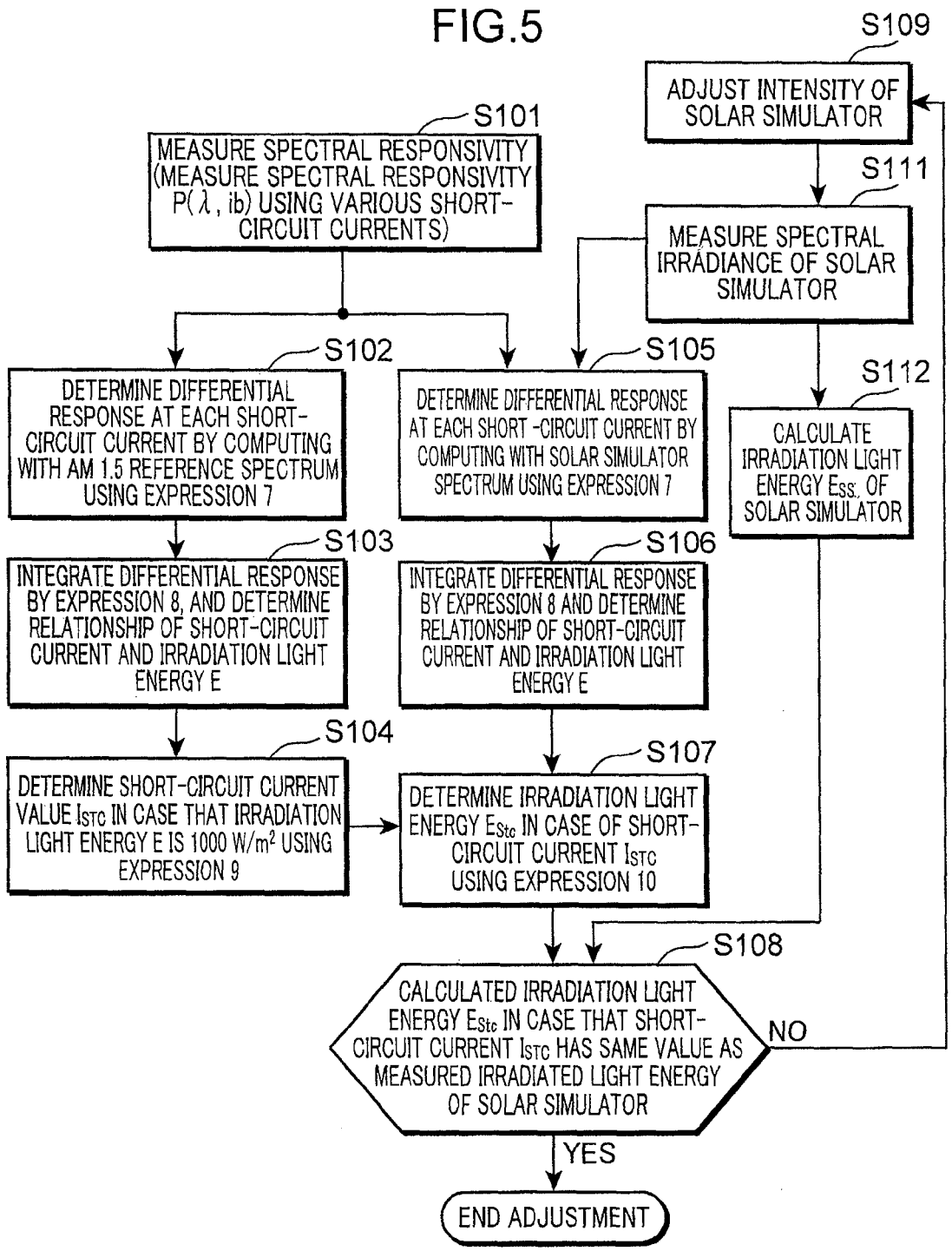
FIG. 5 is a flow chart depicting a method for adjusting the light quantity of the solar simulator according to an embodiment of the present invention.

FIG. 5 is a flow chart depicting the state of adjusting the light quantity of the solar simulator 3 mentioned above. First in step S101 (processing S101), the spectral responsivity P (λ, ib) is measured at various spectral irradiance levels A (λ), then the processing in step S102 and the processing in step S105 are executed. In step S102, the differential response of the short-circuit current value (ib) at each spectral responsivity level P (λ, ib) with respect to the reference spectrum of AM 1.5 is determined by calculation using Expression 7. Then in step S103, the differential response determined in step S102 is integrated using Expression 8, and the relationship between the short-circuit current I and the irradiation light energy E is determined. Then in step S104, the short-circuit current Istc, in a standard state where the irradiation light energy E is 1000 W/m², is determined using Expression 9.

In step S105, on the other hand, the differential response of the short-circuit current value (ib) with respect to the spectrum of the spectral irradiance L (λ) from the solar simulator 3 at each spectral responsivity P (λ, ib) is determined using Expression 7. Then in step S106, the differential response determined in step S105 is integrated using Expression 8, and the relationship between the short-circuit current I and the irradiation light energy E is determined. Then in step S107, the irradiation light energy Estc, when the short-circuit current Istc becomes a value determined in step S104, is determined using Expression 10.

In step S111, on the other hand, the spectral irradiance L (λ) of the solar simulator 3 is measured, and in step S112, the irradiation light energy Ess irradiated by the solar simulator 3 is determined, and in step S108, it is determined whether the irradiation light energy Estc, calculated in step S107, matches with the actual (measured) irradiation light energy Ess of the solar simulator 3 determined in step S112. If it is determined that they match (YES), the light quantity adjustment operation ends, and if they do not match (NO), processing advances to step S109 and the irradiation light intensity of the solar simulator 3 is adjusted, and after the spectral irradiance L (λ) is measured again in step S111, processing returns to step S105.

By matching the value of the short-circuit current Iscref generated by the irradiation light energy Estc determined with the reference sunlight with the value of the short-circuit current Isc generated by the irradiation light energy Ess of the solar simulator 3 like this, the solar simulator 3 can be accurately adjusted so that short-circuit current, equivalent to that by reference sunlight illumination, is generated even if the spectral irradiance is different from the reference sunlight. The irradiation light energy Ess of the solar simulator 3 may be adjusted by the computing unit 14 displaying the irradiation light energy Ess and Estc or short-circuit current Isc and Iscref on the display unit 15, and the operator adjusting the light quantity so that both values becomes the same, or by the computing unit 14 outputting a light quantity control signal CTL to indicate the difference between the values to the solar simulator 3.

With this configuration, the above-mentioned reference cell is not required for calibrating the solar simulator 3, and the solar simulator 3 can easily be calibrated even if the type (=spectral responsivity) of the solar cell 2 changes. The spectral irradiance L (λ) of the solar simulator 3 need not match the spectral irradiance S (λ) by the reference sunlight at an unnecessarily high accuracy, and therefore the cost of the solar simulator 3 can be reduced.

If numerical data on an arbitrary light source, such as a D65 light source, is supplied to the spectral irradiance S (λ), the solar cell 2 can be adjusted to have the short-circuit current in the case of using the light source. In the above description, the spectral irradiance S (λ) of the reference sunlight is a value on the surface of the earth (AM 1.5), but if this value is changed, simulation in any area, including the outer space (AM 0), becomes possible.

As indicated herein above, the present detailed description discloses techniques in various aspects. The major aspects among them will be summarized hereinbelow.

A light source evaluation device according to an aspect comprises: a spectro-radio meter that measures a spectral irradiance L (λ) of a light source for illuminating a measurement target solar cell; a first storage unit that stores a pre-measured spectral irradiance S (λ) of reference sunlight; a second storage unit that stores, as a spectral responsivity Pi (λ) at each of a plurality (i) of irradiation levels, a dependency P (λ, Ib) for each wavelength of a short-circuit current Ib generated by white bias light of the solar cell, which is pre-measured at each irradiance level; and a computing unit that computes a value for adjusting a light quantity of the light source for illuminating the solar cell, using a spectral responsivity Ps (λ) of the solar cell corresponding to the irradiance level of each wavelength of the light source determined by computation using the spectral responsivity Pi (λ) at each of the plurality (i) of irradiation levels of the solar cell, the spectral irradiance S (λ) of the reference sunlight, and the spectral irradiance L (λ) of the light source.

According to another aspect, in the light source evaluation device, it is preferable that the computing unit selects a spectral responsivity Ps (λ) that corresponds to a difference between the spectral irradiance S (λ) of the reference sunlight and the spectral irradiance L (λ) of the light source, out of the spectral responsivity Pi (λ) at each of the plurality (i) of irradiance levels of the solar cell, and determines, as the short-circuit current Isc for adjusting the solar simulator, an effective value of an irradiance level at which the illumination light from the light source actually works on photoelectric conversion for the solar cell having the spectral responsivity Ps (λ).

The light source evaluation device having this configuration is used for a solar cell evaluation device that includes a solar simulator (illumination light source) for adjusting the light quantity of the solar simulator. In the case of calibrating whether the light quantity is a specified value (1000 W/m$^2$), normally a reference solar cell for which the short-circuit current (Isc) is predetermined is used, and the solar simulator is adjusted so that the short-circuit current (Isc) thereof becomes the predetermined value. Whereas in the light source evaluation device having the above configuration, the spectro-radiometer, the computing unit and the spectral responsivity measurement device are used instead of the reference solar cell.

To be more specific, while the spectral irradiance L (λ) of the solar simulator is measured by the spectro-radiometer, the spectral irradiance S (λ) of the reference sunlight, which is predetermined in specifications, is stored in the first storage unit, and the spectral responsivity Pi (λ) at each of the plurality (i) of irradiance levels of the solar cell, which is pre-measured by the spectral responsivity measurement device, is stored in the second storage unit. Then the computing unit selects spectral responsivity Ps (λ) that corresponds to a difference between the spectral irradiance S (λ) of the reference sunlight and the spectral irradiance L (λ) of the light source, out of the spectral responsivity Pi (λ) at each of the plurality (i) of short-circuit current levels (short-circuit current value Ib generated by the white bias light) of the solar cell, and computes an effective value of an irradiance level at which the illumination light from the light source actually works on the photoelectric conversion for the solar cell having the spectral responsivity Ps (λ). The light quantity of the solar simulator is adjusted by the operator, who operates referring to the display, or by feedback control or the like, so that the effective value becomes the specified light quantity value.

Therefore the above-mentioned reference cell (reference solar cell) is not required, and a state of irradiating a specified quantity of light onto the solar cell can easily be reproduced even if the type (=spectral responsivity) of the solar cell changes, and time and cost for creating and calibrating the reference cell can be reduced. In addition, by using the numeric data of an arbitrary light such as the D65 light source for the spectral irradiance S (λ), the electric power generation, in the case of using the solar cell with the arbitrary light source, can be measured. In the same manner, by changing the spectral irradiance S (λ) of the reference sunlight, the electric power generation in the outer space (AM0) or in an arbitrary area can be measured.

Furthermore, if this method is used, the electric power generation at 200 W/m$^2$ (=0.2 Sun) required according to IEC 61215 can be measured by changing S (λ) to 0.2 Sun, and the short-circuit current for adjusting the solar simulator, considering the non-linearity of the solar cell, can be provided.

The spectral responsivity Pi (λ) at each of the plurality (i) of irradiance levels is determined by the dependency for each wavelength λ of the short-circuit current Ib of the solar cell generated by the white bias light. The spectral responsivity Pi (λ) can be measured each time the irradiance is changed in i levels, and the differential coefficient of the short-circuit current ib and the irradiance is determined on the basis of the spectral irradiance L (λ) measured by the spectro-radiometer, whereby the relationship of the irradiance and the short-circuit current is determined. As a consequence, the spectral irradiance to generate appropriate short-circuit current in the solar cell can be more accurately determined based on the actual spectral irradiance waveform of the solar simulator.

According to another aspect, in the above-mentioned light source evaluation device, the computing unit performs feedback control for the light quantity of the light source in response to the computing result.

According to another aspect, in the above-mentioned light source evaluation device, it is preferable that the computing unit adjusts the light quantity of the light source using an absolute spectral sensitivity method on the basis of the spectral responsivity Pi (λ) of the solar cell, which is pre-measured at a plurality (i) of irradiance levels, and the spectral irradiance L (λ) of the light source, so that the irradiance becomes 1000 W/m$^2$ of the reference solar cell.

In this configuration, based on the spectral responsivity Pi (λ) of the solar cell pre-measured at a plurality (i) of irradiance levels and the spectral irradiance L (λ) of the light source, the computing unit uses the spectral responsivity Pi (λ) until the irradiance reaches 1000 W/m$^2$ as the spectral responsivity Ps (λ) at the spectral irradiance L (λ) of the light source according to an absolute spectral sensitivity method.

Thereby the light quantity of the solar simulator can be adjusted, as mentioned above, so that the effective value of the irradiance level that actually works on the photoelectric conversion for the solar cell, becomes a specified value, that is, the intensity to generate the short-circuit current that is generated at 1000 W/m$^2$.

According to another aspect, in the above-mentioned light source evaluation device, the computing unit displays the computing result.

With this configuration, the operator can adjust the light quantity of the solar simulator while checking the display, so that the effective value of the irradiance level that actually works on the photoelectric conversion for the solar cell becomes a specified value, as mentioned above.

According to another aspect, in the above-mentioned light source evaluation device, the computing unit outputs the computing result to the outside.

With this configuration, if such an external control device as a personal computer is connected to an interface for outputting the computing result to the outside, for example, this control device can adjust the light quantity of the solar simulator (illumination light source) so that the effective value of the irradiance level, which actually works on the photoelectric conversion for the solar cell, becomes a specified value, as mentioned above.

A solar cell evaluation device according to another aspect comprises: one of the above-mentioned light source evaluation devices; a solar simulator used as the light source that generates light simulating the reference sunlight and irradiates the light onto the measurement target solar cell; and a current/voltage meter that measures an electricity generation characteristic of the solar cell by the irradiation light from the solar simulator.

With this configuration, the electric power generation characteristic with the irradiation light of the reference sunlight can be accurately determined considering the non-linearity of the spectral responsivity Pi (λ) with respect to the incident light quantity of the solar cell, as mentioned above.

This application is based on Japanese Patent Application No. 2010-180396, filed on Aug. 11, 2010, and the content thereof is included in the present application.

Although the present invention has been described appropriately and sufficiently using the embodiments with reference to the drawings, it should be recognized that modifications and/or improvements of the embodiments can easily be made by those skilled in the art. Therefore unless departing from the scope of the rights stated in the Claims, such modifications or improvements are understood to be within the scope of the Claims.

INDUSTRIAL APPLICABILITY

According to the present invention, the light source evaluation device and the solar cell evaluation device can be provided.

The invention claimed is:

1. A light source evaluation device, comprising:
a spectro-radio meter that measures a spectral irradiance L ($\lambda$) of a light source for illuminating a measurement target solar cell;
a first storage unit that stores a pre-measured spectral irradiance S ($\lambda$) of reference sunlight;
a second storage unit that stores, as a spectral responsivity Pi ($\lambda$) at each of a plurality (i) of irradiation levels, a dependency P ($\lambda$, Ib) for each wavelength $\lambda$ of a short-circuit current Ib generated by white bias light of the solar cell, which is pre-measured with changing the irradiance level in a plurality (i) steps; and
a computing unit that computes a value for adjusting a light quantity of the light source for illuminating the solar cell, using a spectral responsivity Ps ($\lambda$) of the solar cell corresponding to the irradiance level of each wavelength of the light source determined by computation using the spectral responsivity Pi ($\lambda$) at each of the plurality (i) of irradiation levels of the solar cell, the spectral irradiance S ($\lambda$) of the reference sunlight, and the spectral irradiance L ($\lambda$) of the light source, wherein
based on a relation between an amount of change in short-circuit current and an amount of change in irradiation intensity of light, the spectral responsivity Pi ($\lambda$) that the spectrum of the reference sunlight has a spectral irradiance that generates short-circuit current Ib that is the same as in the case where an irradiation light energy is a prescribed value, is used as the spectral responsivity Ps ($\lambda$).

2. The light source evaluation device according to claim 1, wherein
the computing unit performs feedback control for the light quantity of the light source, in response to the computing result.

3. The light source evaluation device according to claim 1, wherein
the computing unit adjusts the light quantity of the light source using a differential spectral responsivity method on the basis of the spectral responsivity Pi ($\lambda$) of the solar cell at each of a plurality (i) of irradiance levels, and the spectral irradiance L ($\lambda$) of the light source, so that the spectrum of the reference sunlight has a spectral irradiance that generates short-circuit current Ib that is the same as in the case where an irradiation light energy is 1000 W/m$^2$.

4. The light source evaluation device according to claim 1, wherein
the computing unit displays the computing result.

5. The light source evaluation device according to claim 1, wherein
the computing unit outputs the computing result to the outside.

6. The solar cell evaluation device, comprising:
the light source evaluation device according to claim 1;
a solar simulator used as the light source that generates light simulating the reference sunlight and irradiates the light onto the measurement target solar cell; and
a current/voltage meter that measures an electricity generation characteristic of the solar cell by the irradiation light from the solar simulator.

* * * * *